(12) United States Patent
Lau et al.

(10) Patent No.: US 6,973,600 B2
(45) Date of Patent: Dec. 6, 2005

(54) BIT ERROR RATE TESTER (75) Inventors: Mo-Ching Justine Lau, Orange, CA (US); Harrison Doan, Huntington Beach, CA (US); Raymond Diaz, Irvine, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 435 days.

(21) Appl. No.: 10/062,306

(22) Filed: Feb. 1, 2002

(65) Prior Publication Data

US 2003/0149921 A1 Aug. 7, 2003

(51) Int. Cl.[7] ............................................. G06F 11/00
(52) U.S. Cl. ...................... 714/704; 714/716; 370/249
(58) Field of Search ................. 714/704, 712, 714/798, 715, 716, 699, 56, 48, 43, 4, 3; 370/249, 295, 468, 401; 375/222, 357; 709/203

(56) References Cited

U.S. PATENT DOCUMENTS

| | | | |
|---|---|---|---|
| 5,136,617 A | * | 8/1992 | Stenard ........................ 375/357 |
| 5,448,616 A | * | 9/1995 | Kaewell et al. .............. 714/712 |
| 5,553,059 A | | 9/1996 | Emerson et al. |
| 5,728,991 A | | 3/1998 | Takada et al. |
| 6,069,876 A | | 5/2000 | Lander et al. |
| 6,108,801 A | | 8/2000 | Malhotra et al. |
| 6,424,636 B1 | * | 7/2002 | Seazholtz et al. ........... 370/295 |
| 6,628,621 B1 | * | 9/2003 | Appleton et al. ........... 370/249 |
| 6,647,058 B1 | * | 11/2003 | Bremer et al. .............. 375/222 |
| 2002/0009089 A1 | * | 1/2002 | McWilliams ................ 370/401 |
| 2002/0141445 A1 | * | 10/2002 | Lee ............................. 370/468 |
| 2002/0188668 A1 | * | 12/2002 | Jeffery et al. ............... 709/203 |

* cited by examiner

*Primary Examiner*—Albert Decady
*Assistant Examiner*—Dipakkumar Gandhi
(74) *Attorney, Agent, or Firm*—Fogg and Associate, LLC; Jon M. Powers (57) ABSTRACT

A device apparatus and method are detailed that allow for improved bit error rate (BER) testing, configuration, and operation of a communication device and associated physical communication link, in particular on a HDSL communication device and link. The improved communication device apparatus and method additionally allow for the communication device to utilize an embedded BER tester (BERT) to run commonly utilized BER tests on high speed communication channels (downstream and upstream) associated with the communication device. The device apparatus and method also allow for a BER test to be configured and initiated remotely, with loopback at a remote device and masking of alarm states at the remote device or local device until the BER test is complete.

55 Claims, 7 Drawing Sheets

BIT ERROR RATE TESTER

TECHNICAL FIELD

The present invention relates generally to communication devices and in particular the present invention relates to bit error rate (BER) testers in communication devices.

BACKGROUND

Modern networks and network systems are typically constructed of multiple differing devices, elements, or links, referred to collectively herein as elements. These elements include communication devices that connect networks and other elements across a link. Links can be virtual links that connect through other communication devices or physical links that connect across physical wire, cables, wireless, or optical connections. Links can be of multiple protocols and physical connections and signaling methods. Telecommunication devices are specialized communication devices that connect networks and elements across links that are part of a telecommunications or phone system. Examples of such include, but are not limited to, digital subscriber line (DSL), ethernet links, modems, token ring, network hubs, network switches, wide area network (WAN) bridges, integrated services digital network (ISDN) devices, T1 termination units, etc. In particular, one recent such communications link and protocol is the high-speed digital subscriber line (HDSL), which has 2 wire and 4 wire variants.

Communication devices can have many physical configurations and implementations. Two popular physical configurations are the standalone enclosure and the line card chassis. Standalone enclosures, also called customer premise equipment (CPE), are typically used at end user sites or link terminal sites where only one device is required. Line card chassis, also called modular rack chassis, are popular in network hubs or telecommunication offices (also known as central offices or COs) where multiple communication links end and the density and central management capability of a line card chassis is an advantage.

Many communication devices have a Flash or other non-volatile machine usable media containing firmware or software program routines that are utilized in device operation. The firmware is typically loaded by the communication device after power up or initialization into the main memory of a processing device that operates the communication device and is executed to begin function of the communication device in the network. Alternatively, in some communication devices, the processing device can execute the firmware in place from the non-volatile machine usable media.

Communication-network device speeds and performance requirements have increased to the point where measuring communication device and communication link characteristics is more important than ever. Reductions in power usage and variable power transmitters have also lowered operating voltages and reducing signal strength, additionally increasing the need for communication system verification and testing. Manufacturers and system operators because of these and other similar reasons have experienced an increasing need to verify installation and line quality so that communication devices will run reliably after installation at their specified speed and power settings.

One such manner of system verification is called the bit error rate (BER) test of the installed communication devices and the physical communications link that connects them. During a BER test a test pattern of bits is sent through the physical communications link and the received pattern is compared against the original test pattern. If a mismatch occurs it is recorded as an error. A BER test can be run in one directional mode (pattern is sent one way from a transmitter to a remote receiver) or duplex mode (where the remote device is put into "loopback" and the test pattern is sent back to and compared on the originating device, and both the upstream and downstream communication links are tested at once in this operating mode).

The total number of recorded errors over a time period gives the BER of the installation. The longer the sampling period is the better the recorded BER will be to the actual BER of the communication system (communication devices in combination with the physical communications link). Adjustments can be then be made in a communication device, physical link, or system configuration to try to improve the overall BER to that which is required for the installation for operation.

BER tests can utilize many bit patterns, framing, and communication standards for testing purposes. One such bit pattern is the pseudo-random bit sequence, or PRBS. A PRBS is an algorithmically deterministic bit sequence that nevertheless has the same statistical characteristics as a truly random sequence. Other commonly used bit testing patterns are the "1 in 7", "2 in 8", and "3 in 24".

Modern BER testers (BERTs) are commonly an external piece of equipment that is coupled to the communication device, communication link, or communication system to be tested and are capable of running many types of tests and bit patterns. In many cases only a subset of the tests are utilized by the manufacturer or system operator to characterize and tune any given communication device, link, or system. Additionally, it is also often the case that it is desired to run BER characterization tests on multiple systems or devices at the same time or in differing locations where having a limited number of external BER testers available at a single time is inconvenient. The external BER testers must also be transported by the manufacturer or system operator personnel to each new location and coupled to the communication device, link, or system to test.

BER tests with external testers are also typically initiated manually, with the BER tester being coupled to the communication link and specific configuration commands being given to coupled communications devices to put them in a testable mode. In many cases the remote communications device must be manually put in a loopback mode and/or have any error or alarm states that would be affected by the BER test manually masked off or disabled. In certain cases this must be done by manufacturer or system operator personnel at the remote site. The local communication device may also have to have error or alarm states that would be affected by the BER test manually masked off or disabled, adding to the inconvenience of the task.

For the reasons stated above, and for other reasons stated below which will become apparent to those skilled in the art upon reading and understanding the present specification, there is a need in the art for a method and apparatus of conveniently initiating, testing, and running BER diagnostics in communication devices and communication links.

SUMMARY

The above-mentioned problems with apparatus of conveniently initiating, testing, and running BER diagnostics in communication devices and communication links are addressed by embodiments of the present invention and will be understood by reading and studying the following specification.

In one embodiment, a High-speed Digital Subscriber Line (HDSL) communication device includes a HDSL communication interface, an upstream communication interface, a communication circuit coupled to the HDSL communication interface and the upstream communication interface, a bit error rate test (BERT) circuit coupled to the communication circuit, and a processor coupled to the communication circuit and the BERT circuit, wherein the processor commands the BERT circuit to initiate a bit error rate (BER) test.

In another embodiment, a communication system includes a first and a second High-speed Digital Subscriber Line (HDSL) communication device, each HDSL communication device having a HDSL interface and at least one other communication interface, a HDSL communication link coupled to the HDSL interface of the first HDSL communication device and to the HDSL interface of the second HDSL communication device, wherein the first HDSL communication device initiates a bit error rate (BER) test on the HDSL communication link and locally masks all alarms until the BER test is complete.

In yet another embodiment, a method of operating a communications system includes initializing a Bit Error Rate (BER) test across a communication link coupled between a first and a second High-speed Digital Subscriber Line (HDSL) communication device, masking errors locally in the first HDSL communications device until completion of the BER test, sending a test pattern signal through the communication link from the first HDSL communication device to the second HDSL communication device, receiving a return signal from the second HDSL communication device at the first HDSL communication device, and comparing the test pattern signal with the received return signal on the first HDSL communication device to determine a bit error rate.

In a further embodiment, a method of operating a communications system includes initializing a Bit Error Rate (BER) test across a communication link coupled between a first and a second High-speed Digital Subscriber Line (HDSL) communication device, sending a test pattern signal through the communication link from the first HDSL communication device to the second HDSL communication device, receiving a return signal from the second HDSL communication device to the first HDSL communication device, comparing the test pattern signal with the received return signal on the first HDSL communication device to determine a bit error rate, and masking errors at the second HDSL communications device until completion of the BER test.

In yet a further embodiment, a method of operating a High-speed Digital Subscriber Line (HDSL) communication device includes initializing a Bit Error Rate (BER) test across a communication link coupled to the HDSL communication device, sending a test pattern signal though the communication link, receiving a return signal, comparing the test pattern signal with the received return signal to determine a bit error rate, and masking errors locally in the HDSL communications device until completion of the BER test.

In another embodiment, a method of operating a High-speed Digital Subscriber Line (HDSL) communication device includes initializing a Bit Error Rate (BER) test across a communication link coupled to the HDSL communication device to a second HDSL communications device, sending a test pattern signal though the communication link, receiving a return signal, comparing the test pattern signal with received return signal to determine a bit error rate, and masking errors in the second HDSL communications device until completion of the BER test.

In yet another embodiment, a method of operating a communication device includes initializing a Bit Error Rate (BER) test across a communication link coupled to the communication device, sending a test pattern signal though the communication link, receiving a return signal, comparing the test pattern signal with received return signal to determine a bit error rate, and masking errors locally in the communications device until completion of the BER test.

In a further embodiment, a method of operating a communication device includes initializing a Bit Error Rate (BER) test across a communication link coupled to the communication device to a second communications device, sending a test pattern signal though the communication link, receiving a return signal, comparing the test pattern signal with received return signal to determine a bit error rate, and masking errors in the second communications device until completion of the BER test.

In yet a further embodiment, a machine-usable medium has machine-readable instructions stored thereon for execution by a processor of a communication device to perform a method. The method includes initializing a Bit Error Rate (BER) test across a communication link coupled to the communication device, sending a test pattern signal though the communication link, receiving a return signal, comparing the test pattern signal with received return signal to determine a bit error rate, and masking errors locally in the communications device until completion of the BER test.

Other embodiments are described and claimed.

DETAILED DESCRIPTION

In the following detailed description, reference is made to the accompanying drawings that form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

As stated above, BER testing of communication devices and communication links with external BERT equipment are involved tasks for manufacturers and system operators. This is particularly the case where the system operator must configure a remote communication device at a remote location into loopback mode, mask or disable alarm conditions, and restore the remote device when finished testing. Additionally, in many cases the extended features of the external BERT equipment is not required or multiple systems are required to be tested simultaneously or in separate locations. Various embodiments of the present invention utilize embedded BERT testing circuitry and routines that enable system operator to direct the communication device to initialize and conduct a BER test through a standard interface without external BER test equipment. Various embodiments of the present invention also allow the BER test to be conducted and configured remotely with an appropriate remote communication device; allowing remote loopback configuration at the remote communication device and remote or local masking of alarm states until the BER testing is complete. BER testing in embodiments of the present invention can also be configured to run on either the upstream or downstream communication link. Additionally, since the BER tester is embedded in communication device embodiments of the present invention, multiple BER tests may be conducted at the same time, or at diverse locations at the same time, increasing system operator efficiency and productivity.

BER tests in embodiments of the present invention can utilize many bit patterns, framing, and communication standards for their testing. Bit patterns include, but are not limited to, PRBS (2^23-1), PRBS (2^20-1), PRBS (2^15-1), "1 in 7", "2 in 8", and "3 in 24". The selectable durations for the BER tests include, but are not limited to, 5 minutes, 60 minutes, or continuous.

Figure 1:
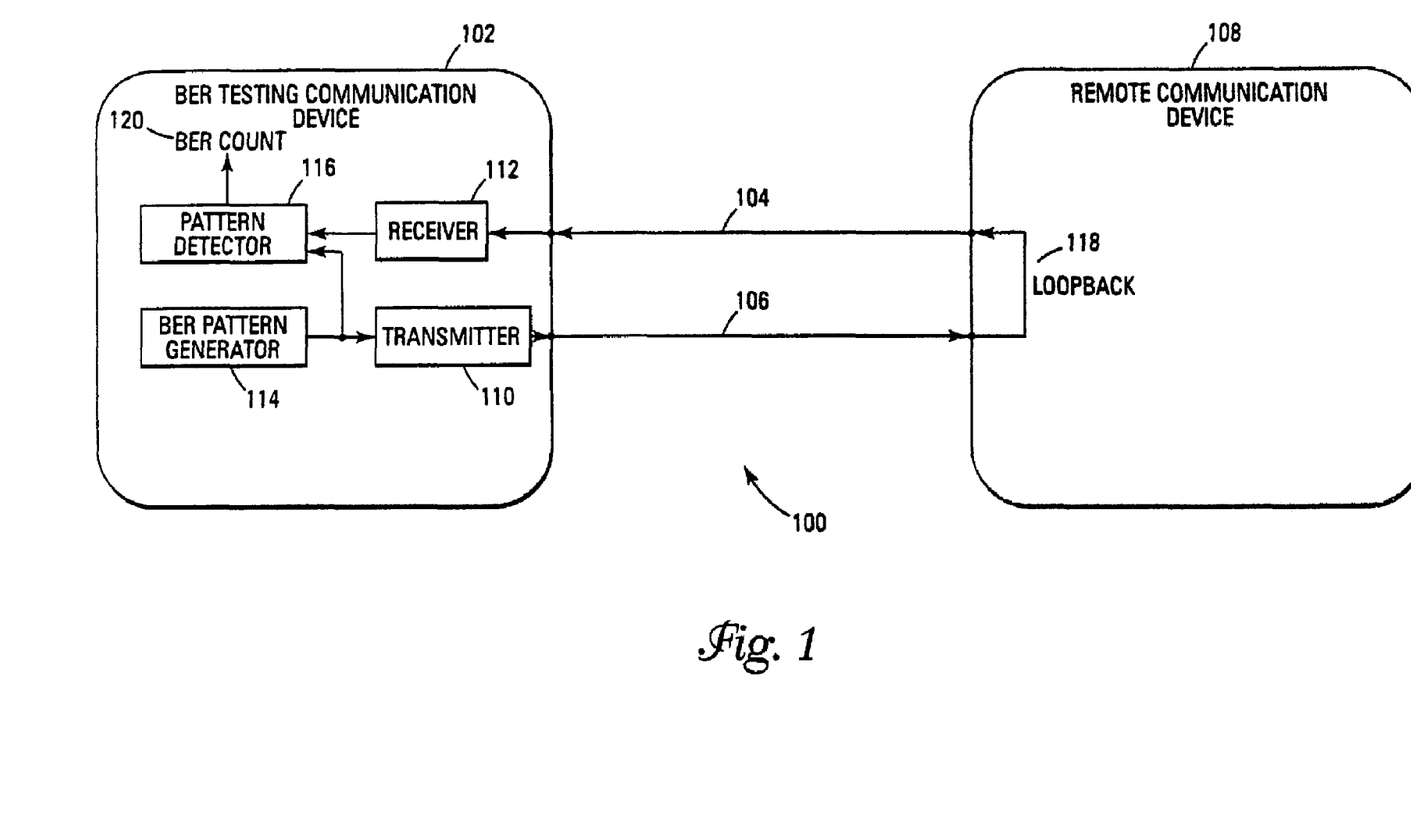
FIG. 1 is a simplified diagram of a communication system according to one embodiment of the present invention.

FIG. 1 is a simplified diagram of a communication system 100 according to one embodiment of the present invention. In FIG. 1, a communication device 102 conducting a BER test is coupled through a physical communication link comprising an upstream communication link 104 and a downstream communication link 106 to a remote communication device 108. The communication device 102 conducting the BER test contains a transmitter 110 coupled to the downstream communication link 106, and a receiver 112 coupled to the upstream communication link 104. It is noted that other physical communication links are possible, and that in some embodiments the downstream and upstream communication links 104, 106 are the same physical link. A BER pattern generator 114 is coupled to the transmitter 110 and to a pattern detector 116. During a BER test a selected bit pattern is generated by the BER pattern generator 114 and is coupled to both the transmitter 110 and the pattern detector 116. The selected BER bit test pattern is transmitted by the transmitter through the coupled downstream communication link 106 to the remote communication device 108.

The remote communication device 108 is internally configured in loopback mode which couples the received bit pattern to the upstream communication link at 118. The loopback coupling 118 in the remote communication device 108 is in various embodiments accomplished by physically coupling the upstream or downstream communication links 104, 106, by coupling the output of the receiver (not shown) and input of the transmitter (not shown) of the remote communication device 108 either directly or through an indirect manner, or the like. The bit pattern is transmitted through the upstream communication link 104 from the loopback coupled 118 remote communication device 108 to the receiver 112 of the communication device 102 conducting the BER test. The receiver 112 couples the received bit pattern to the pattern detector 116 which synchronizes and compares the generated test bit pattern with the received bit pattern. If mismatches occur they are recorded and presented on the BER count output 120. It is noted that other configurations of communication devices with internal BER testers are possible and should be apparent to those skilled in the art with the benefit of the present disclosure.

Figure 2:
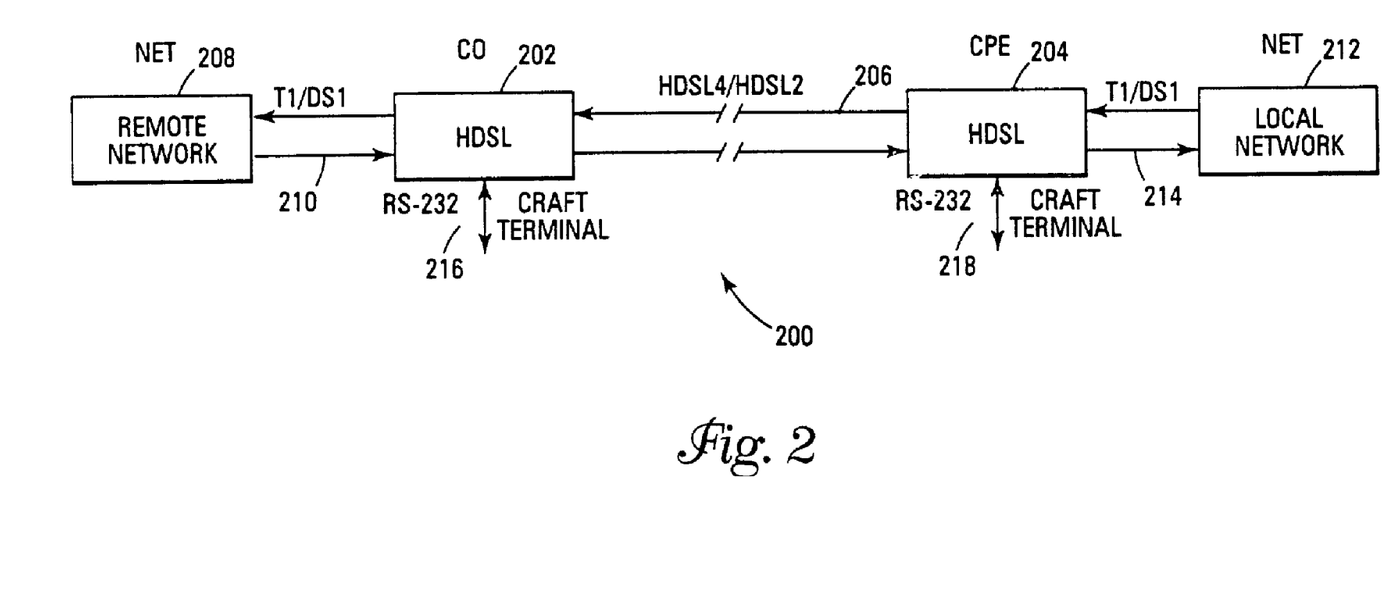
FIG. 2 is a simplified diagram of a communication system according to one embodiment of the present invention.

FIG. 2 is a simplified diagram of a communication system 200 according to one embodiment of the present invention. In FIG. 2, a central office (CO) HDSL communication device 202 is coupled to a customer premise equipment (CPE) remote HDSL communication device 204 with a two or four wire HDSL communication link 206. The CO HDSL communication device 202 is coupled to an upstream network 208 with a T-carrier T1 link 210 with in one embodiment American National Standards Institute (ANSI) T1.107 standard digital signal 1 (DS1) signaling. The CPE HDSL communication device 204 is coupled to a downstream network 212 with a T1 communication link 214 that also uses DS1 signaling. Both the CO HDSL communication device 202 and the CPE HDSL communication device 204 also contain an embedded BERT test circuit (not shown) and a RS-232 "craft terminal" 216, 218 that allows system operator with a simple data terminal to configure, control, monitor of the respective communication device and its embedded BER test abilities.

In operation, data destined for the remote upstream network 208 is conveyed from the downstream local network 212 through the T1 communication link 214 to the CPE HDSL communication device 204 where it is conveyed through the HDSL communication link 206 to the CO HDSL communication device 202. The upstream data is then communicated from the CO HDSL communication device 202 through the T1 link 210 to the remote upstream network 208. Conversely, data destined for the downstream local network 212 is conveyed from the remote upstream network 208 through the T1 link 210 to the CO HDSL communication device 202, where it is communicated through the HDSL communication link 206 to the CPE HDSL communication device 204. The downstream data is then communicated from the CPE HDSL communication device 204 to the downstream local network 212 through the T1 communication link 214.

BER testing can occur in the communication system 200 of FIG. 2 in multiple manners and directions. Each HDSL communication device 202, 204 contains an embedded BERT testing circuit (not shown), this allows a system operator to conduct BER tests through either the HDSL interface or the T1 interface from either HDSL communication device 202, 204. Thus in FIG. 2, BER testing can be done from the CO HDSL communication device 202 through the T1 link 210 to the remote upstream network 208, from the CO HDSL communication device 202 through the HDSL communication link 206 to the CPE HDSL communication device 204, from the CPE HDSL communication device 204 to the downstream local network 212 through the T1 communication link 214, and from the CPE HDSL communication device 204 through the HDSL communication link 206 to the CO HDSL communication device 202. In each case the receiving communication device is in loopback mode and the originating HDSL communication device conducts the BER test and generates the BER bit pattern.

Protocol errors and/or alarms can happen in communication systems with complex communication protocols. Unfortunately, these alarm conditions can cause problems with system diagnostic such as a BER test because of the automated responses they evoke from the communication device which automatically engage routines that attempt to diagnose and recover from the error condition. These automated diagnosis and recovery routines can disrupt or delay the triggering diagnostic or BER test if the automated response is not disabled or "masked" out. One such error in the HDSL communication devices 202, 204 of FIG. 2 that can cause problems for BER testing is a T1 DS1 framing error, which occurs when the current DS1 data frame of the T1 link is overrun with the next as it is stalled waiting for transmission upstream from a communication device that is in a BER test mode or loopback mode. Alarm or error masking is accomplished for BER testing purposes either on the remote communication device, preventing it from sending an alarm signal to the BER testing communication device, or locally on the BER testing communication device, preventing it from recognizing the alarm or error state and initiating the automated diagnosis and recovery routines for the duration of the BER test.

Before a BER test can occur the remote communication device is configured into loopback mode and any error states or alarms are masked off or disabled. One method of configuring the remote communication device into loopback mode is through manual configuration of the remote device by the system operator. This manual configuration is accomplished physically at the remote communication device, through a craft interface on the remote communication device, or remotely via specialized management software or through a management device and control network in a rack chassis. Error or alarm masking is manually accomplished in the remote communication device in the same manner in one embodiment.

Another manner of configuring the remote communication device into loopback is through a command transferred remotely from the testing communication device over the communication link. In many complex communication protocols, provision is made for command or control communication signaling with the remote communication device. One such manner of command or control communication signaling with the remote communication device over T1/DS1 or HDSL protocol is with what is called an embedded operation channel (EOC). With the EOC, communication device embodiments of the present invention send a command from the testing communication device to the remote communication device to place the remote device in loopback mode.

One embodiment of the present invention utilizes the EOC channel to configure the remote communication device alarm and error masking while BER testing. Another embodiment of the present invention utilizes the EOC to send a command from the testing communication device to the remote communication device to place the remote device in loopback mode and then configures a local mask of the alarm and error events on the testing communication device.

A HDSL communication device is one type of communication device that is utilized in a modular rack chassis, CO, or CPE embodiment of the present invention. One embodiment of a HDSL modem line card communications device is the H4TU-R or H4TU-C systems made by ADC Telecommunications, Inc. Eden Prairie, Minn. The H4TU-R and H4TU-C HDSL modems contains several LAN dataports that include a T1 dataport, and a RS-232 craft port. The H4TU-R and H4TU-C HDSL modems also include an HDSL WAN dataport that is coupled to the downstream network.

Figure 3:
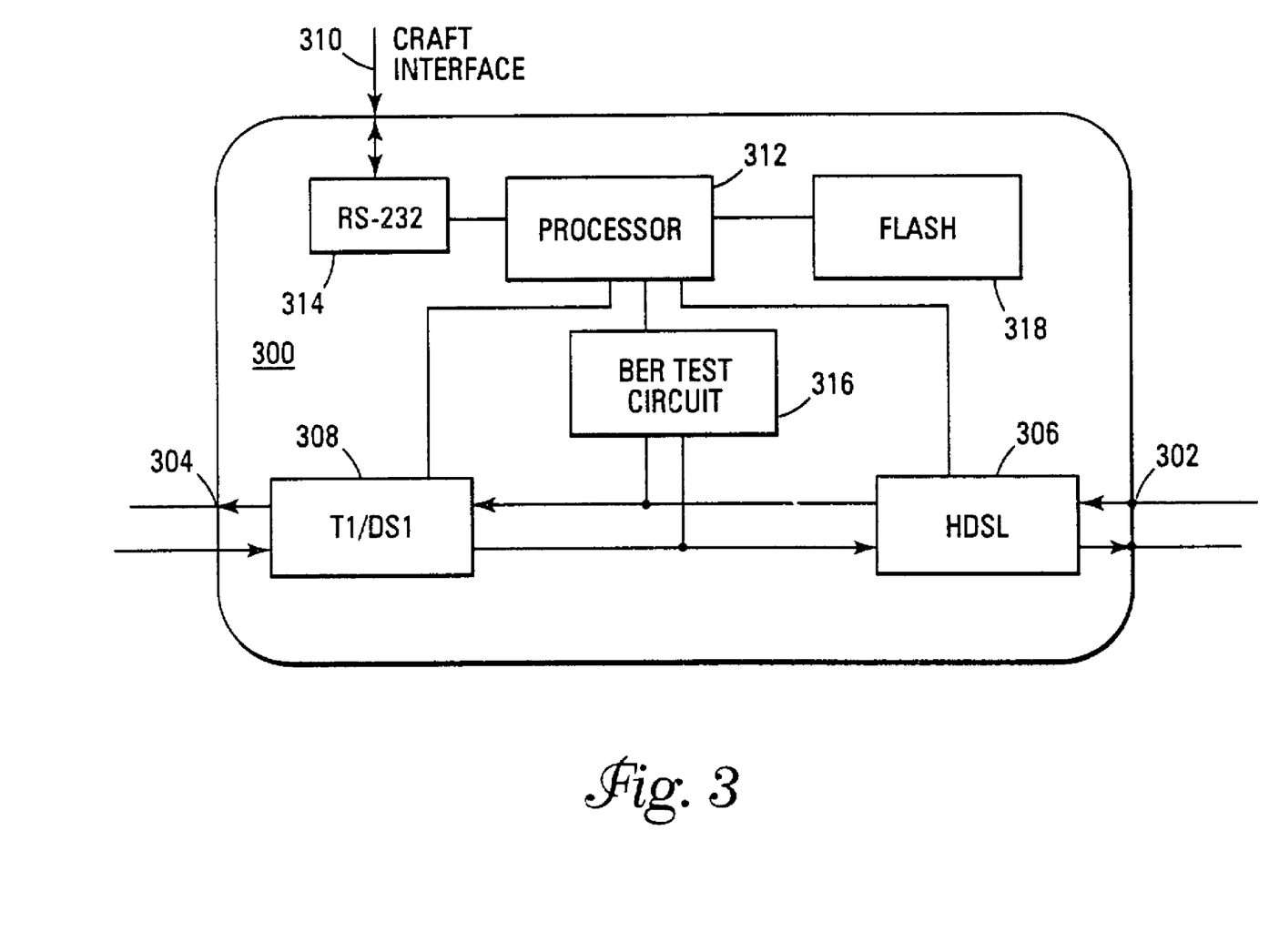
FIG. 3 is a simplified diagram of a communication device according to one embodiment of the present invention.

FIG. 3 is a simplified diagram of a HDSL communication device 300 according to one embodiment of the present invention. The communication device 300 has a HDSL interface 302 that can be coupled to a HDSL communication link and T1 interface 304 that can be coupled to a T1 communication link and will carry a DS1 signal. The HDSL communication device 300 also has a local craft RS-232 interface 310. The communication device internally contains a processor 312, T1/DS1 interface circuit 308, HDSL interface circuit 306, a BER test circuit 316, a RS-232 interface circuit 314, and non-volatile machine usable firmware storage media 318, such as a Flash memory or the like. The HDSL interface circuit 306 is coupled to the HDSL interface 302 and the T1/DS1 interface circuit 308 is coupled to the T1 interface 304 of the HDSL communication device 300.

Internally, the HDSL interface circuit 306 is additionally coupled to the T1/DS1 interface circuit 308 to pass data through the HDSL communication device 300. The BER test circuit 316 is also coupled to the HDSL interface circuit 306 and the T1/DS1 interface circuit 308 to allow it to send and receive BER test pattern bit streams during a BER test. In this configuration the BER test circuit can send and receive BER test pattern bit streams through either the HDSL interface circuit 306 and coupled HDSL interface 302 or the T1/DS1 interface circuit 308 and coupled T1 interface 304, depending on configuration and the interface that is being BER tested. The processor 312 is coupled to, controls, and communicates with the T1 interface 304, the HDSL interface circuit 306, and the BER test circuit 316. The processor 312 is also coupled to the non-volatile machine usable firmware storage media 318, which contains the software routines or firmware required to initialize, configure, and operate the HDSL communication device 300. The non-volatile machine usable firmware storage media 318 also contains any software routines that are utilized to initiate, configure, and run a BER test on either the HDSL interface 302 or T1 interface 304 from the HDSL communication device 300 and the embedded BER test circuit 316.

The processor 312 is additionally coupled to the RS-232 interface circuit 314 of the craft interface 310, which allows the system operator to communicate with the HDSL communication device 300 with a RS-232 data terminal and control and configure it or initiate, configure, and run BER tests on either the HDSL interface 302 or T1 interface 304 with the embedded BER test circuit 316. It is noted that other manners of system operator control are possible, including but not limited to configuration of the HDSL communication device or initiation of a BER test remotely through an additional network communication interface or alternatively, through the network interface (HDSL interface 302 or T1 interface 304) that is not under BER test.

It is also noted that other communication interfaces, dataports, communication busses, and/or other proprietary communication interface or protocol can also be included in various embodiments on the HDSL communication device 300 of FIG. 3, increasing communication options and configurations. An example of one such proprietary communications bus is the "Cellbus" communications chassis backplane bus of ADC Telecommunications, Inc. Eden Prairie, Minnesota.

Communication device software routines that initialize and operate the communication device are collectively referred to as firmware or ROM after the non-volatile read only memory (ROM) machine usable storage device that such routines have historically been stored in. It is noted that such firmware or ROM routines are stored on a variety of machine usable storage mediums that include, but are not limited to, a non-volatile Flash memory, a read only memory (ROM), a electrically erasable programmable read only memory (EEPROM), a one time programmable (OTP) device, a complex programmable logic device (CPLD), an application specific integrated circuit (ASIC), a magnetic media disk, etc. It is also noted that communication devices can take multiple other physical forms, including, but not limited to, communication devices that are functions of other systems, or network elements that have the communication device functionality expressed in firmware or even hard-coded in a device such as an application-specific integrated circuit (ASIC) chip.

Figure 4A:
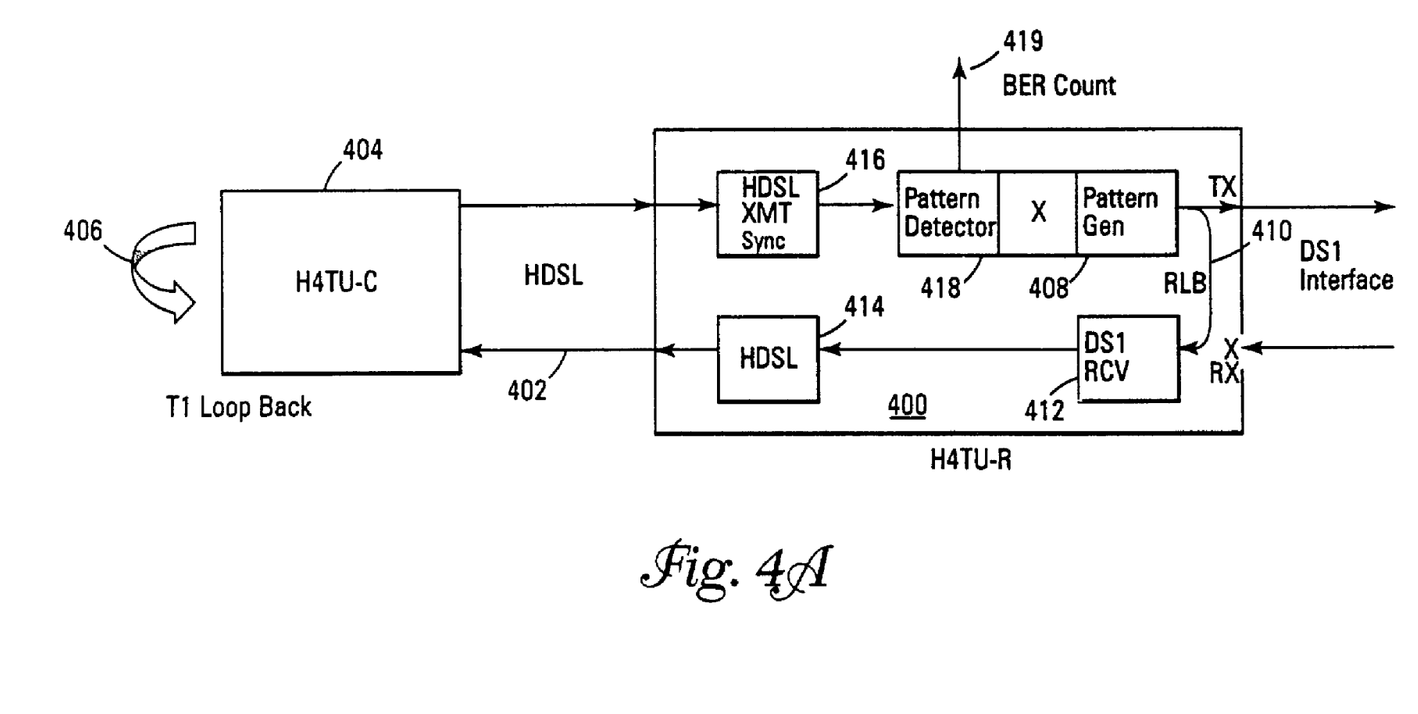
FIGS. 4A, 4B, 4C, and 4D are simplified diagrams of embodiments of the present invention.

FIGS. 4A, 4B, 4C, and 4D are simplified diagrams of HDSL communication device embodiments of the present invention in BER test mode. FIG. 4A is a simplified diagram of an embodiment of the present invention wherein a H4TU-R CPE HDSL communication device 400 is coupled in BER test mode to a remote H4TU-C CO HDSL communication device 404 via a HDSL communication link 402. The remote H4TU-C CO HDSL communication device 404 is configured in loopback mode 406 through its T1 interface. Internal to the H4TU-R CPE HDSL communication device 400 in BER test mode, pattern generator 408 is coupled to DS1 receiver 412 to inject a selected BER test bit pattern through a remote loopback 410. The BER test bit pattern is coupled from the DS1 receiver 412 to the HDSL transmitter 414 and through the HDSL communication link 402 to the remote H4TU-C CO HDSL communication device 404. The T1 interface loopback of the remote H4TU-C CO HDSL communication device 404 couples the received BER test bit pattern back through the HDSL communication link 402 to HDSL receiver and transmit synchronizer 416 which is in turn coupled to BER pattern detector 418. The BER pattern detector 418 compares the received BER test bit pattern with the selected BER bit pattern from the BER pattern generator 408 over the duration of the BER test and reports the BER error count 419.

Figure 4B:
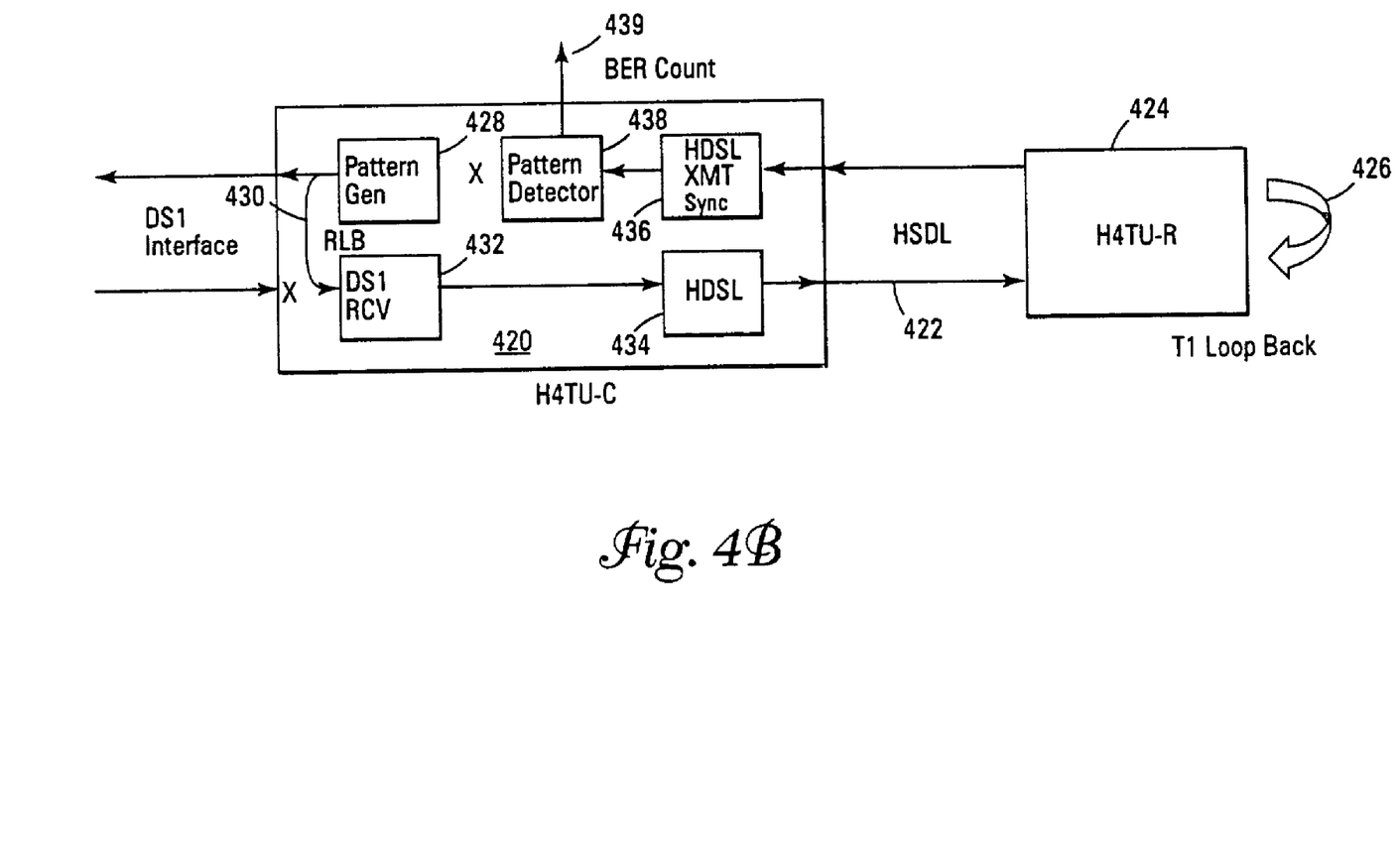

FIG. 4B is a simplified diagram of an embodiment of the present invention wherein a H4TU-C CO HDSL communication device 420 is coupled in BER test mode to a remote H4TU-R CPE HDSL communication device 424 via a HDSL communication link 422. The remote H4TU-R CPE HDSL communication device 424 is configured in loopback mode 426 through its T1 interface. Internal to the H4TU-C CO HDSL communication device 420 in BER test mode, pattern generator 428 is coupled to DS1 receiver 432 to inject a selected BER test bit pattern through a remote loopback 430. The BER test bit pattern is coupled from the DS1 receiver 432 to the HDSL transmitter 434 and through the HDSL communication link 422 to the remote H4TU-R CPE HDSL communication device 424. The T1 interface loopback of the remote H4TU-R CPE HDSL communication device 424 couples the received BER test bit pattern back through the HDSL communication link 422 to the HDSL receiver and transmit synchronizer 436 which is in turn coupled to the BER pattern detector 438. The BER pattern detector 438 compares the received BER test bit pattern with the selected BER bit pattern from the BER pattern generator 428 over the duration of the BER test and reports the BER error count 439.

Figure 4C:
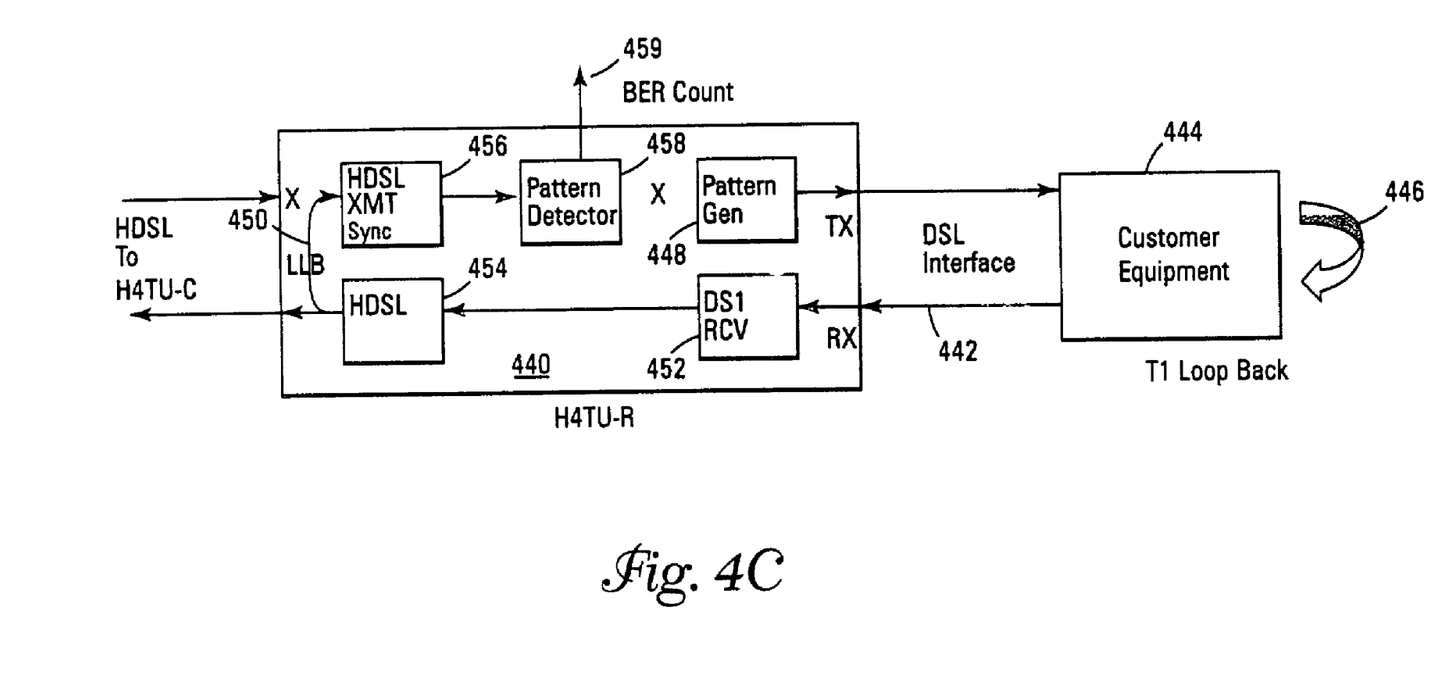

FIG. 4C is a simplified diagram of an embodiment of the present invention wherein a H4TU-R CPE HDSL communication device 440 is coupled in BER test mode to a downstream remote communication device 444 via a T1/DS1 communication link 442. Internal to the H4TU-R CPE HDSL communication device 440 in BER test mode, pattern generator 448 is coupled to send a selected BER test bit pattern through the T1/DS1 communication link 442 to the remote communication device 444. The remote communication device 444 is configured in loopback mode 446 and couples the received BER test bit pattern back through the T1/DS1 communication link 442 to DS1 receiver 452 of the H4TU-R CPE HDSL communication device 440. The received BER test bit pattern is coupled from the DS1 receiver 452 to HDSL transmitter 454 of the H4TU-R CPE HDSL communication device 440. The HDSL transmitter 454 is coupled through a local loopback 450 to HDSL receiver and transmit synchronizer 456 which is in turn coupled to BER pattern detector 458. The BER pattern detector 458 compares the received BER test bit pattern with the selected BER bit pattern from the BER pattern generator 448 over the duration of the BER test and reports the BER error count 459.

Figure 4D:
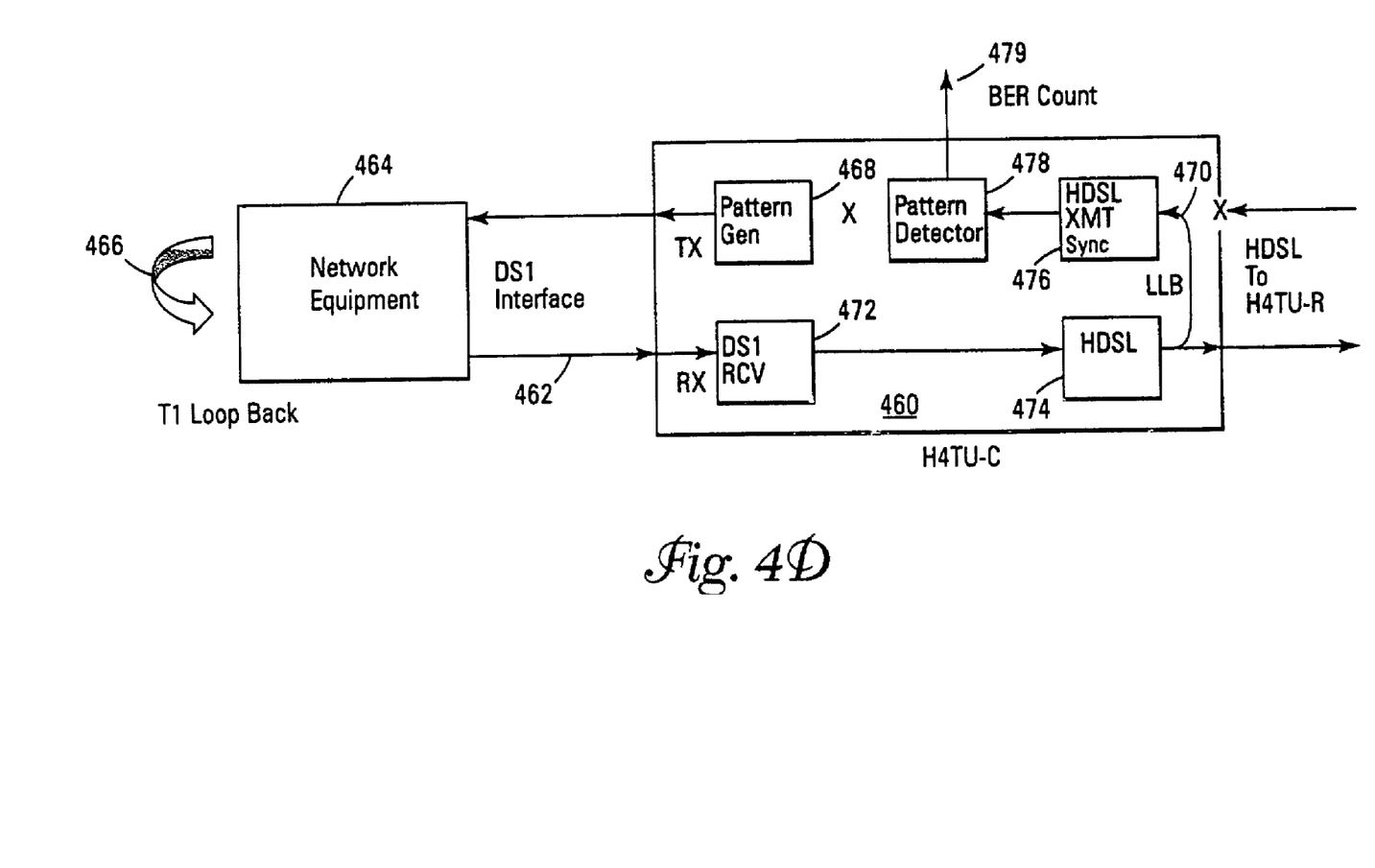

FIG. 4D is a simplified diagram of an embodiment of the present invention wherein a H4TU-C CO HDSL communication device 460 is coupled in BER test mode to an upstream remote communication device 464 via a T1/DS1 communication link 462. Internal to the H4TU-C CO HDSL communication device 460 in BER test mode, pattern generator 468 is coupled to send a selected BER test bit pattern through the T1/DS1 communication link 462 to the remote communication device 464. The remote communication device 464 is configured in loopback mode 466 and couples the received BER test bit pattern back through the T1/DS1 communication link 462 to DS1 receiver 472 of the H4TU-C CO HDSL communication device 460. The received BER test bit pattern is coupled from the DS1 receiver 472 to HDSL transmitter 474 of the H4TU-C CO HDSL communication device 460. The HDSL transmitter 474 is coupled through a local loopback 470 to HDSL receiver and transmit synchronizer 476 which is in turn coupled to BER pattern detector 478. The BER pattern detector 478 compares the received BER test bit pattern with the selected BER bit pattern from the BER pattern generator 468 over the duration of the BER test and reports the BER error count 479.

It is noted that other configurations of loopback and BER test circuit insertion in the communication chain are possible and will be apparent to those skilled in the art with the benefit of the present disclosure.

Alternative communication device embodiments of the present invention with an embedded BER tester will be apparent to those skilled in the art with the benefit of the present disclosure, and are also within the scope of the present invention.

CONCLUSION

A device apparatus and method have been described that allows for improved bit error rate (BER) testing, configuration, and operation of a communication device and associated physical communication link, in particular on a HDSL communication device and link. The improved communication device apparatus and method additionally allows for the communication device to utilize an embedded BER tester (BERT) to run commonly utilized BER tests on high speed communication channels (downstream and upstream) associated with the communication device. The improved device apparatus and method also allows for the BER test to be configured and initiated remotely, with loopback at a remote device and masking of alarm states at the remote device or local device until the BER test is complete.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A High-speed Digital Subscriber Line (HDSL) communication device, comprising:
   a HDSL communication interface;
   an upstream communication interface;
   a communication circuit coupled to the HDSL communication interface and the upstream communication interface;
   a bit error rate test (BERT) circuit coupled to the communication circuit; and
   a processor coupled to the communication circuit and the BERT circuit, wherein the processor commands the BERT circuit to initiate a bit error rate (BER) test;
   wherein the HDSL communication device remotely configures a second communication device to mask errors during the BER test.

2. The HDSL communication device of claim 1, wherein the HDSL communication device further comprises:
   a machine-usable storage media coupled to the processor, where the processor utilizes BER firmware stored on the machine-usable storage media to operate the BERT circuit.

3. The HDSL communication device of claim 1, wherein the HDSL communication device further comprises:
   a craft part coupled to the processor, wherein a BER test is initiated by the processor by a command from the craft port.

4. The HDSL communication device of claim 1, wherein the HDSL communication interface contains an embedded operation channel (EOC), such that command signals may be expressed on the EOC by the HDSL communication device.

5. The HDSL communication device of claim 4, wherein the EOC command signal is a loopback configuration command signal.

6. The HDSL communication device of claim 1, wherein the upstream communication interface contains an embedded operation channel (EOC), such that command signals may be expressed on the EOC by the HDSL communication device.

7. The HDSL communication device of claim 6, wherein the EOC command is a loopback configuration command.

8. The HDSL communication device of claim 1, wherein the communication link is coupled to a T1 communication interface of the HDSL communication device.

9. The HDSL communication device of claim 1, wherein a test pattern is generated and compared by the bit error rate test (BERT) circuit coupled to the HDSL communication device.

10. The HDSL communication device of claim 1, wherein a digital signal 1 (DS1) loss event error is masked by the HDSL communication device.

11. The HDSL communication device of claim 1, wherein the BER test is initiated on the HDSL communication interface.

12. The HDSL communication device of claim 1, wherein the BER test is initiated on the upstream communication interface.

13. A communication system, comprising:
   a first and a second High-speed Digital Subscriber Line (HDSL) communication device, each HDSL communication device having a HDSL interface and at least one other communication interface;
   a HDSL communication link coupled to the HDSL interface of the first HDSL communication device and to the HDSL interface of the second HDSL communication device, wherein the first HDSL communication device initiates a bit error rate (BER) test on the HDSL communication link and locally masks all alarms until the BER test is complete;
   wherein the first HDSL communication device remotely configures the second HDSL communication device to mask errors during the BER test.

14. The communication system of claim 13, wherein the first HDSL communication device expresses a loopback command signal on the HDSL communication link.

15. The communication system of claim 13, wherein the first HDSL communication device further comprises:
   a machine usable storage media coupled to a processor, where the processor controls BER test with firmware from the machine usable storage media.

16. A method of operating a communications system, comprising:
   initializing a Bit Error Rate (BER) test across a communication link coupled between a first and a second High-speed Digital Subscriber Line (HDSL) communication device;
   masking errors locally in the first HDSL communications device until completion of the BER test;
   sending a test pattern signal through the communication link from the first HDSL communication device to the second HDSL communication device;
   receiving a return signal from the second HDSL communication device at the first HDSL communication device;
   comparing the test pattern signal with the received return signal on the first HDSL communication device to determine a bit error rate; and
   remotely configuring the second HDSL communication device to mask errors until completion of the BER test.

17. The method of claim 16, further comprising:
   setting the second HDSL communication device into loopback mode.

18. The method of claim 16, further comprising:
   sending a loopback configuration command to the second HDSL communications device over an embedded operation channel (EOC).

19. The method of claim 16, wherein BER routines are stored on a machine readable storage medium coupled to the first HDSL communication device.

20. The method of claim 16, wherein the test pattern is generated and compared by an integrated bit error rate test (BERT) circuit coupled to the first HDSL communication device.

21. The method of claim 16, wherein a digital signal 1 (DS1) loss event error is masked by the first HDSL communication device.

22. A method of operating a communications system, comprising:
   initializing a Bit Error Rate (BER) test across a communication link coupled between a first and a second High-speed Digital Subscriber Line (HDSL) communication device;
   sending a test pattern signal through the communication link from the first HDSL communication device to the second HDSL communication device;
   receiving a return signal from the second HDSL communication device to the first HDSL communication device;
   comparing the test pattern signal with the received return signal on the first HDSL communication device to determine a bit error rate; and remotely configuring the second HDSL communication device to mask errors at the second HDSL communications device until completion of the BER test.

23. The method of claim 22, further comprising:
sending a loopback configuration command to the second HDSL communications device over an embedded operation channel (EOC).

24. The method of claim 23, wherein the EOC command to the second HDSL communications device is an error mask command.

25. The method of claim 23, wherein the EOC command to the second HDSL communications device is an alarm mask command.

26. The method of claim 22, wherein BER routines are stored on a machine readable storage medium coupled to the first HDSL communication device.

27. The method of claim 22, wherein the test pattern is generated and compared by an integrated bit error rate test (BERT) circuit coupled to the first HDSL communication device.

28. The method of claim 22, wherein a DS1 loss event error is masked by the second HDSL communication device.

29. A method of operating a High-speed Digital Subscriber Line (HDSL) communication device, comprising:
initializing a Bit Error Rate (BER) test across a communication link coupled to the HDSL communication device;
sending a test pattern signal though the communication link;
receiving a return signal;
comparing the test pattern signal with the received return signal to determine a bit error rate; and
masking errors locally in the HDSL communications device until completion of the BER test; and
remotely configuring a second communication device that is coupled to the communication link to mask errors until completion of the BER test.

30. The method of claim 29, further comprising:
setting the second communication device that is coupled to the communication link into loopback mode.

31. The method of claim 30, wherein the second communication device is a HDSL communication device.

32. The method of claim 30, further comprising:
sending a loopback configuration command to the second communications device over an embedded operation channel (EOC).

33. The method of claim 29, wherein BER routines are stored on a machine readable storage medium coupled to the HDSL communication device.

34. The method of claim 29, wherein the communication link is coupled to a HDSL communication interface of the HDSL communication device.

35. The method of claim 29, wherein the communication link is coupled to a T1 communication interface of the HDSL communication device.

36. The method of claim 29, wherein the test pattern is generated and compared by an integrated bit error rate test (BERT) circuit coupled to the HDSL communication device.

37. The method of claim 29, wherein a DS1 loss event error is masked by the HDSL communication device.

38. A method of operating a High-speed Digital Subscriber Line (HDSL) communication device, comprising:
initializing a Bit Error Rate (BER) test across a communication link coupled to the HDSL communication device to a second HDSL communications device;
sending a test pattern signal though the communication link;
receiving a return signal;
comparing the test pattern signal with received return signal to determine a bit error rate; and
remotely configuring the second HDSL communication device to mask masking errors in the second HDSL communications device until completion of the BER test.

39. The method of claim 38, further comprising:
expressing a command on an embedded operation channel (EOC) to the second HDSL communications device.

40. The method of claim 39, wherein the EOC command to the second HDSL communications device is a loopback configuration command.

41. The method of claim 39, wherein the EOC command to the second HDSL communications device is an error mask command.

42. The method of claim 39, wherein the EOC command to the second HDSL communications device is an alarm mask command.

43. The method of claim 38, wherein BER routines are stored on a machine readable storage medium coupled to the HDSL communication device.

44. The method of claim 38, wherein the test pattern is generated and compared by an integrated bit error rate test (BERT) circuit coupled to the HDSL communication device.

45. The method of claim 38, wherein a DS1 loss event error is masked by the second HDSL communication device.

46. A method of operating a communication device, comprising:
initializing a Bit Error Rate (BER) test across a communication link coupled to the communication device;
sending a test pattern signal though the communication link;
receiving a return signal;
comparing the test pattern signal with received return signal to determine a bit error rate; and
masking errors locally in the communications device until completion of the BER test; and
remotely configuring a second communication device coupled to the communication link to mask errors until completion of the BER test.

47. The method of claim 46, further comprising:
setting the second communication device that is coupled to the communication link into loopback mode.

48. The method of claim 47, wherein the second communication device is a HDSL communication device.

49. The method of claim 47, further comprising:
sending a command to the second communications device over an embedded operation channel (EOC).

50. The method of claim 49, wherein the EOC command to the second communications device is a loopback configuration command.

51. A method of operating a communication device, comprising:
initializing a Bit Error Rate (BER) test across a communication link coupled to the communication device to a second communications device;
sending a test pattern signal though to communication link;
receiving a return signal;
comparing the test pattern signal with received return signal to determine a bit error rate; and
remotely configuring the second communication device to mask errors in the second communications device until completion of the BER test.

52. The method of claim 51, further comprising:
sending a command to the second communications device over an embedded operation channel (EOC).

53. The method of claim 52, wherein the EOC command to the second communications device is a loopback configuration command.

54. The method of claim 52, wherein the EOC command to the second communications device is an error mask command.

55. A machine-usable medium having machine-readable instructions stored thereon for execution by a processor of a communication device to perform a method comprising:

initializing a Bit Error Rate (BER) test across a communication link coupled to the communication device;

sending a test pattern signal though the communication link;

receiving a return signal;

comparing the test pattern signal with received return signal to determine a bit error rate; and remotely configuring a second communication device coupled to the communication link to mask errors in the second communication device until completion of the BER test.

* * * * *

UNITED STATES PATENT AND TRADEMARK OFFICE
CERTIFICATE OF CORRECTION

PATENT NO.       : 6,973,600 B2                                        Page 1 of 1
APPLICATION NO.  : 10/062306
DATED            : December 6, 2005
INVENTOR(S)      : Lau et al.

It is certified that error appears in the above-identified patent and that said Letters Patent is hereby corrected as shown below:

At Claim 38, Column 14, Line 5, remove the first occurrence of "masking"

Signed and Sealed this

Eighteenth Day of November, 2008

JON W. DUDAS
*Director of the United States Patent and Trademark Office*